United States Patent
Takagi

(10) Patent No.: US 6,486,630 B2
(45) Date of Patent: Nov. 26, 2002

(54) POWER WINDOW APPARATUS CAPABLE OF LEAVING WINDOWS OPEN FOR A PREDETERMINED TIME WHEN AUTOMOBILE FALLS INTO WATER

(75) Inventor: Isao Takagi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/929,919

(22) Filed: Aug. 15, 2001

(65) Prior Publication Data

US 2002/0024309 A1 Feb. 28, 2002

(30) Foreign Application Priority Data

Aug. 25, 2000 (JP) .......................... 2000-260866

(51) Int. Cl.[7] .............................................. H02P 7/00
(52) U.S. Cl. ..................... 318/445; 318/256; 318/266; 318/286; 318/446; 318/466; 318/468; 307/9.1; 307/10.1; 307/113; 307/115; 307/116
(58) Field of Search ............................... 318/256, 266, 318/267, 280, 283, 286, 445, 446, 466, 468; 307/9.1, 10.1, 113, 115, 116

(56) References Cited

U.S. PATENT DOCUMENTS

| | | | | |
|---|---|---|---|---|
| 5,994,797 A | * | 11/1999 | Yamaoka | 307/125 |
| 6,031,296 A | * | 2/2000 | Takagi et al. | 307/10.1 |
| 6,060,794 A | * | 5/2000 | Takagi et al. | 307/125 |
| 6,081,085 A | * | 6/2000 | Ohashi et al. | 318/283 |
| 6,111,373 A | * | 8/2000 | Ohashi | 318/265 |
| 6,201,363 B1 | * | 3/2001 | Miyazawa | 318/283 |
| 6,246,564 B1 | * | 6/2001 | Sugiura et al. | 361/166 |
| 6,396,227 B2 | * | 5/2002 | Sasaki | 318/283 |

FOREIGN PATENT DOCUMENTS

JP 2000-120330 4/2000

* cited by examiner

Primary Examiner—Robert E. Nappi
Assistant Examiner—Rina I. Duda
(74) Attorney, Agent, or Firm—Brinks Hofer Gilson & Lione

(57) ABSTRACT

A power window apparatus is provided that, even if a CPU (IC2) causes malfunction or becomes uncontrollable upon submergence, can prevent windows from performing unexpected operations and enables the windows to be opened without fail if desired. The power window apparatus comprises: a driving part that has two current input-output ends, and opens or closes automobile open/close parts, depending on the direction of a flowing current; two relays which respectively have exciting coils and switching contacts, wherein, when a current is fed to the exciting coils, the switching contacts connect the current input-output end to a positive or negative pole of power; a submergence detecting sensor that drops in resistance value between both ends thereof when exposed to water; and a submergence-time escape switch that forcibly drives the open/close parts open upon submergence, wherein transistors are provided which are connected in series with the exciting coils and feed a current to the exciting coils, and the bases of the transistors are grounded via the submergence detecting sensor.

4 Claims, 4 Drawing Sheets

POWER WINDOW APPARATUS CAPABLE OF LEAVING WINDOWS OPEN FOR A PREDETERMINED TIME WHEN AUTOMOBILE FALLS INTO WATER

BACKGROUND OF THE INVENTION

1. Field of the Invention

The present invention relates to a power window apparatus, and more particularly to a power window apparatus capable of opening windows for a predetermined time (e.g., five minutes) when an automobile falls into water.

2. Description of the Prior Art

Although conventional power window apparatus used in an automobile are designed to remain operational when the automobile falls into water, they often fail to operate as intended because the operation of their electrical system is made unstable by water, with the result that passages cannot escape from the automobile and their life may be risked. Accordingly, there is proposed a power window apparatus that retains its reliability and will function to open the windows for a predetermined time after the automobile falls into water.

Such a conventional power window apparatus will be described with reference to FIG. 4. As shown in FIG. 4, the power window apparatus includes a driving part 51, relays 52 and 53, transistors 55 and 60, a control part 58, a submergence detecting sensor 72, a window close switch (UP) 64, and a window open switch (Down) 65. The control part (hereinafter referred to as CPU) 58 comprises a microcomputer, ASIC (application-specific integrated circuit), and the like.

The driving part 51, which is a reversible motor for opening or closing open/close parts (hereinafter referred to as windows) not shown, rotates (Down) so as to open the windows when a current flows from the upper side to the lower side in a circuit shown in FIG. 3, and rotates (Up) so as to close the windows when a current flows from the lower side to the upper side.

The relays 52 and 53 respectively have switches 52a and 53a, and exciting coils 52b and 53b, and only when a control voltage is applied to only one of the exciting coils 52b and 53b, power from an automobile power terminal 54 is supplied to the driving part 51 via the switches 52a and 53a.

The transistor 55 has: a base connected to an output pin P06 of CPU 58 via a resistor 56 and an inverter 57 in series; a collector grounded via the exciting coil 52b; and an emitter connected with an automobile power terminal 59.

A transistor 60 has: a base connected to an output pin P07 of CPU 58 via a resistor 61 and an inverter 62 in series; a collector connected with connected with one end of the exciting coil 53b; and an emitter connected with an automobile power terminal 63.

The CPU 58 has plural input-output pins; input pins (P71, P72, P73) are applied with voltages to serve as signals from the window close switch (UP) 64, the window open switch (Down) 65, and the submergence detecting sensor 72, and according to the signals, minute currents to serve as signals for turning the transistors 55 and 60 on or off are outputted from the output pins (P07, P06).

Both the window close switch (UP) 64 and the window close switch (Down) 65, only when operated, switch a connection destination of one end thereof from the ground to the automobile power terminal 66. Another end of the window close switch (UP) 64 is connected to the input pin P71 of the CPU 58 via an inverter 67 and a pullup power 68. Another end of the window open switch (Down) 65 is connected to the input pin P72 of the CPU 58 via an inverter 69 and a pullup power 70, and to another end of the exciting coil 53b.

The submergence detecting sensor 72 comprises a pair of conductors disposed in opposed relation to each other and in proximity to each other, and when exposed to water, it is brought into conduction with a small resistance value so that one end thereof is grounded and the other end thereof is connected to an automobile power terminal 73 and the base of the transistor 74.

The transistor 74 has an emitter connected to the automobile power terminal 73 and a connector connected to the input pin P73 of the CPU 58.

With the above construction, when the window close switch (UP) 64 or the window open switch (Down) 65 is operated, a signal corresponding to the operated switch is inputted to the input pin P71 or P72 of the CPU 58. According to the inputted signal, the CPU 58 outputs a signal of minute current from the output pin P06 or P07 to the transistor 55 or 60 via the inverter 57 or 62. The transistor 55 or 60 is turned on or off by the outputted signal so that a voltage is applied to the exciting coil 52b or 53b. Accordingly, the switch 52a or 53a is switched so that the automobile power is supplied to the driving part 51, whereby the driving part 51 rotates forward or backward to open or close windows.

When the submergence detecting sensor 72 is exposed to water, the transistor 74 goes on because the base thereof goes into a ground voltage, and a voltage from the automobile power terminal 73 is inputted to the input pin P73 of the CPU 58. When the voltage is inputted to the input pin P73, the CPU 58 outputs minute currents of, e.g., +5 V from both the output pins P06 and P07, which are inputted to the transistors 55 and 60 via the comparators 57 and 62, with the result that both the transistors 55 and 60 are turned on. Since a voltage is applied to both the exciting coils 52b and 53b, both the switches 52a and 53a are switched and an equal voltage is applied to both input-output pins of the driving part 51, so that the driving part does not operate. Consequently, the windows do not operate, either.

At this time, when the window open switch (Down) 65 is operated, a connection destination of one end of the switch 65 is switched from the ground to the automobile power terminal 66. Then, since a series circuit from the automobile power terminal 63 having applied a voltage to the exciting circuit 53b is not grounded, a current flow is stopped, and since a higher voltage is developed at the cathode side of a diode 71 by the automobile power terminal 66, no voltage is applied to the exciting coil 53b. As a result, since a voltage is applied to only the exciting coil 52b and only the switch 52a is switched, the automobile power is applied to the driving part 51, which starts operation, so that the windows are opened.

By the above-described construction and operation, even if an automobile falls into water, the windows can be opened, so that occupants can escape from it.

However, this power window apparatus has the following problem. Parts and circuits except the CPU 58, upon submergence, undergo reduction in insulation resistance between terminals but operate for a predetermined time (e.g., five minutes), while the CPU 58, which performs control by slight currents, may cause malfunction or run away uncontrollably upon submergence. For example, a slight current of, e.g., +5 V, which is outputted from both the output pins P06 and P07 to turn on the transistors 55 and 60, leaks elsewhere at submergence, with the result that the slight current from the CPU 58 minus the leak current may yield to further result in failure of both the transistors 55 and 60 to be turned on, so that the windows may move in unexpected directions or may not be opened even if the window open switch (Down) 65 is operated.

SUMMARY OF THE INVENTION

The present invention has been made to solve the problem and provides a power window apparatus that, even if a CPU causes malfunction or becomes uncontrollable upon submergence, can prevent windows from performing unexpected operations and enables the windows to be opened without fail if desired.

To solve the problem, a power window apparatus of the present invention comprises: a driving part that has two current input-output ends, and drives automobile open/close parts open or close, depending on the direction of a driving current flowing via the current input-output ends; two relays which each have an exciting coil and a switching contact, wherein, when a current is fed to the exciting coil, the switching contact connects the current input-output end to a positive or negative pole of power; a submergence detecting sensor that drops in resistance value between both ends thereof when exposed to water; and a submergence-time escape switch that forcibly drives the open/close parts open upon submergence, wherein two transistors are provided which are connected in series with the exciting coils and feed a current to the exciting coils when turned on, and the base of each transistor is connected to a potential point through which a base current flows via the submergence detecting sensor.

By this construction, even if insulation resistance between terminals of discrete parts such as transistors drops because of submergence, currents can be fed to the exciting coils without fail and both switching contacts of the relays are switched, whereby voltages at the current input-output ends of the driving part become equal and the driving part is stopped, with the result that the Fiji operation of the open/close parts can be stopped without fail and the open/close parts can be opened by operating the submergence-time escape switch.

The power window apparatus of the present invention comprises: a driving part that has two current input-output ends, and drives automobile open/close parts open or close, depending on the direction of a driving current flowing via the current input-output ends; two relays which each have an exciting coil and a switching contact, wherein, when a current is fed to the exciting coil, the switching contact connects the current input-output end to a positive or negative pole of power; a submergence detecting sensor that drops in resistance value between both ends thereof when exposed to water; and a submergence-time escape switch that forcibly drives the open/close parts open upon submergence, wherein two transistors are provided which are connected in series with the exciting coils and feed a current to the exciting coils when turned on, and the base of each transistor is connected to a potential point through which a base current flows via a transistor the base of which is connected to a potential point through which a base current flows via the submergence detecting sensor.

By this construction, at submergence, the operation of the open/close parts can be stopped, and by operating the submergence-time escape switch, the open/close parts can be opened, and the submergence detecting sensor can detect submergence quickly and surely because, if a base current of one transistor flows, two transistors can be turned on.

Furthermore, the power window apparatus of the present invention is provided with a transistor that applies a voltage of automobile power to both ends of one of the exciting coils, wherein the transistor is turned on when the submergence detecting sensor is exposed to water and the submergence-time escape switch is operated.

By this construction, when the submergence-time escape switch is operated, since voltages of both ends of one of the exciting coils can be made equal, it can be further ensured that no current flows through the other of the exciting coils, and thereby the windows can be opened further surely when the submergence-time escape switch is operated.

BRIEF DESCRIPTION OF THE DRAWINGS

Preferred embodiments of the present invention will be described in detail based on the followings, wherein.

DESCRIPTION OF THE PREFERRED EMBODIMENTS

Hereinafter, a power window apparatus of the present invention will be described with reference to FIGS. 1 to 3.

Figure 1:
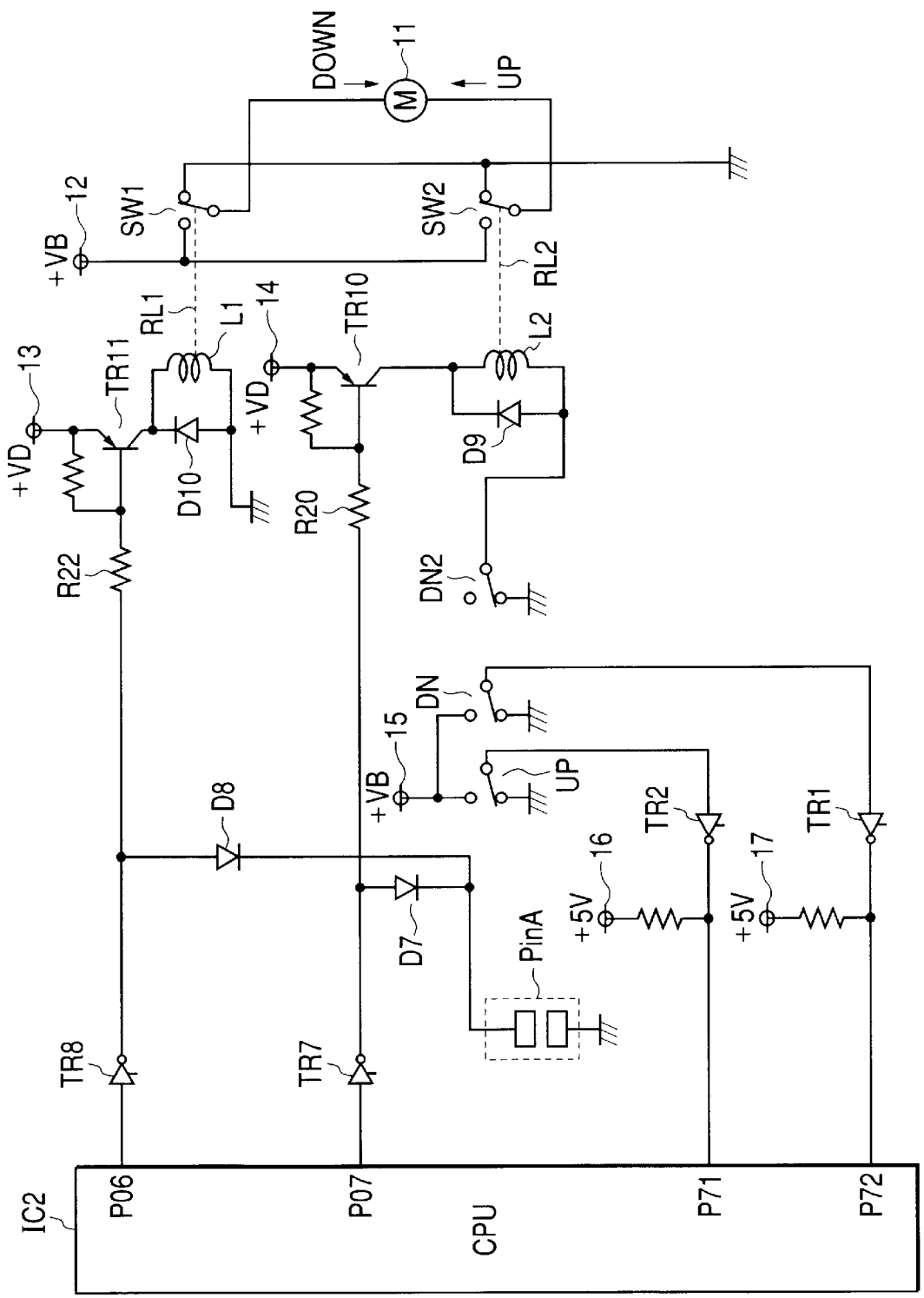
FIG. 1 is a circuit diagram showing a first embodiment of a power window apparatus of the present invention.

FIG. 1 is a circuit diagram showing a first embodiment of a power window apparatus of the present invention. The power window apparatus of the present invention comprises: a driving part 11; two relays RL1 and RL2; two transistors TR11 and TR10; a window open operation switch (DN); a window close operation switch (UP); a submergence-time escape switch (DN2); a submergence detecting sensor PinA; a control part IC2; and automobile power terminals 12, 13, 14, and 15. The automobile power terminals 12 and 15 supply an automobile power voltage (+VB), and the automobile power terminals 13 and 14 supply a voltage (+VD) (about 0.7 V lower than +VB) via a back-flow preventing diode from the automobile power voltage (+VB). The control part IC2 comprises a microcomputer, ASIC (application-specific integrated circuit), and the like.

The driving part 11, which comprises a reversible, e.g., motor having two current input-output ends for opening or closing automobile open/close parts (windows, sunroof, doors, etc., hereinafter simply referred to as windows) not shown, rotates (Up) so as to close the windows when a current flows from the lower side to the upper side in the circuit shown in FIG. 1, and rotates (Down) so as to open the windows when a current flows from the upper side to the lower side.

The relays RL1 and RL2 respectively have switches SW1 and SW2, and exciting coils L1 and L2, wherein the switching contacts SW1 and SW2 have their respective moving contacts connected to mutually different power input-output ends of the driving part 11, with one of their respective fixed contacts connected to the automobile power terminal 12 and the other grounded. The moving contacts of the switching contacts SW1 and SW2 are usually connected to the grounded fixed contacts as shown in the drawing, and are connected to the fixed contacts of the automobile power terminal 12 side only as long as a voltage is applied to the coils L1 and L2. Specifically, when a voltage is applied to both the exciting coils L1 and L2, since voltages between the two power input-output ends of the driving part 11 become equal, the driving part 11 stops operating. When a voltage is applied to only one of the exciting coils L1 and L2, power from the automobile power terminal 12 is supplied to the driving part 11 via the switching contacts SW1 and SW2, so that the driving part 11 is opened or closed.

The PNP-type transistor TR11 has: a base connected to the output pin P06 of the control part (CPU) IC2 via a resistor R22 and an inverter TR8 in series; a collector grounded via the exciting coil L1; and an emitter connected to the automobile power terminal 13.

The PNP-type transistor TR10 has: a base connected to the output pin P07 of the control part (CPU) IC2 via a resistor R20 and an inverter TR7 in series; a collector connected with one end of the exciting coil L2; and an emitter connected to the automobile power terminal 14.

The control part (CPU) IC2 has plural input-output pins; the input pins (P71, P72) are applied with voltages to serve as signals from the operation switches DN and UP, and a voltage to serve as a signal for turning the transistors TR11 and TR10 on or off is outputted from the output pins (P06, P07).

Both the operation switch (UP) and the operation switch (DN), only when operated, switch a connection destination of one end thereof from the ground to the automobile power terminal 15. Another end of the operation switch (UP) is connected to an input pin P71 of the control part (CPU) IC2 via an inverter TR2 and a pullup power 16. Another end of the operation switch (DN) is connected to an input pin P72 of the control part (CPU) IC2 via an inverter TR1 and a pullup power 17 in series.

The submergence-time escape switch (DN2), which forcibly opens the open/close parts at submergence, is placed anywhere within a series circuit comprised of a power supply terminal 14, the transistor TR10, the exciting coil L2, and the ground. The submergence-time escape switch (DN2) is usually conducting, and only when operated, is brought out of conduction and cuts off a current to the exciting coil L2. The submergence-time escape switch (DN2) can be shared with the operation switch (DN) by connecting another end of the operation switch (DN) with another end of the exciting coil L2 via a back-flow preventing diode. In this case, the back-flow preventing diode operates to prevent the transistor TR10 from being destroyed when one end of the operation switch (DN) is switched to the automobile power terminal 15 side. The submergence-time escape switch (DN2) and the operation switch (DN) may be used as an interlock switch so as operate in conjunction with each other.

The submergence detecting sensor PinA comprises a pair of conductors disposed in opposed relation to each other and in proximity to each other, and when exposed to water, it is brought into conduction with a small resistance value between both ends thereof so that one end thereof is grounded and the other end thereof is connected to a connection point between the inverter TR7 and the resistor R20 via a diode D7, and to a connection point between the inverter TR8 and the resistor R22 via a diode D8.

In the above-described construction, a description will be made of how the power window apparatus operates when the submergence detecting sensor PinA detects no water. In this case, since the submergence detecting sensor PinA is out of conduction, independently of the circuit, when the operation switch (UP) is operated, one end of the operation switch (UP) is switched to the automobile power terminal 15 side, and a voltage from the automobile power terminal 15 is inputted to the input pin P71 of the control part (CPU) IC2 via the inverter TR2. In response to the inputted signal, the control part (CPU) IC2 outputs a signal from the output pin P07 to the transistor TR10 via the inverter TR7. The transistor TR10 is turned on by the outputted signal so that a voltage from the automobile power terminal 14 is applied to the exciting coil L2, with the result that the switching contact SW2 is switched to supply the automobile power to the driving part 11, whereby the driving part 11 rotates to close the windows.

When the operation switch (DN) is operated, one end of the operation switch (DN) is switched to the automobile power terminal 15 side, and a voltage from the automobile power terminal 15 is inputted to the input pin P72 of the control part (CPU) IC2 via the inverter TR1. In response to the inputted signal, the control part (CPU) IC2 outputs a signal from the output pin P06 to the transistor TR11 via the inverter TR8. The transistor TR11 is turned on by the outputted signal so that a voltage from the automobile power terminal 13 is applied to the exciting coil L1, with the result that the switching contact SW1 is switched to supply the automobile power to the driving part 11, whereby the driving part 11 rotates to open the windows.

Next, a description will be made of how the power window apparatus operates when the submergence detecting sensor PinA detects water. In this case, since the submergence detecting sensor PinA is brought into conduction with a small resistance value between both ends thereof and one end thereof is grounded, base voltages of the transistors TR11 and TR10 become low. Consequently, the transistors TR11 and TR10 are turned on, their collectors are applied with a voltage from the automobile power terminals 13 or 14, and the voltage is applied to both the exciting coils L1 and L2, with the result that no voltage is supplied to the driving part 11, which will not operate. Therefore, the windows will not operate, either.

At this time, if the submergence-time escape switch (DN2) is operated, both ends of the submergence-time escape switch (DN2) are separated from each other. Consequently, since the series circuit comprised of a power supply terminal 14, the transistor TR10, the exciting coil L2, and the ground is disconnected from the ground, no current flows through the exciting coil L2, with the result that a voltage is applied to only the exciting coil L1, so that the automobile power is supplied to the driving part 11. The driving part 11 starts operation and the windows are opened.

With the above-described construction and operation, since the power window apparatus operates independently of control of the control part (CPU) IC2, even when an automobile falls into water, the windows are surely stopped without performing unexpected operations, and can be surely opened by operating the submergence-time escape switch (DN2), thus enabling occupants to escape from the automobile.

Figure 2:
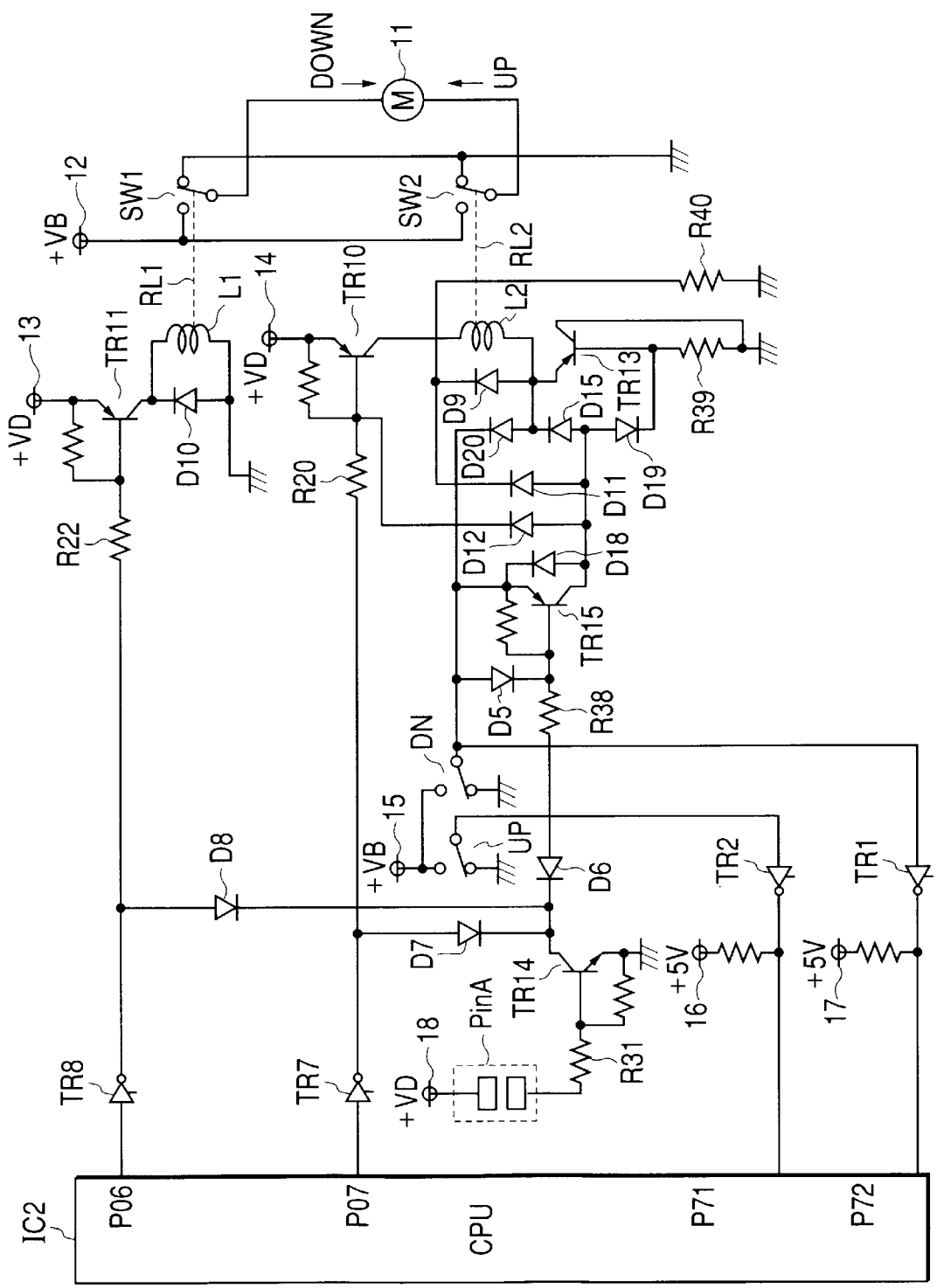
FIG. 2 is a circuit diagram showing a second embodiment of the power window apparatus of the present invention.

Next, FIG. 2 is a circuit diagram showing a second embodiment of the power window apparatus of the present invention. Components in FIG. 2 that are identical to components in FIG. 1 showing the first embodiment are identified by the same reference numerals, and a detailed description of them is omitted.

In the second embodiment, transistors TR14, TR13, and TR15 are provided. The submergence-time escape switch (DN2) is shared with the operation switch (DN) and will be hereinafter described as "operation switch (DN)."

The submergence detecting sensor PinA is connected to the automobile power terminal 18, and another end thereof is connected to the base of the NPN-type transistor TR14 via a resistor R31, the emitter of the transistor TR14 is grounded, and the collector thereof is connected to a connection point between the inverter TR7 and the resistor R20 via the diode D7, and to a connection point between the inverter TR8 and the resistor R22 via the diode D8.

The base of the PNP-type transistor TR13 is grounded via a resistor R39, the collector is also grounded, and the emitter is connected to the other end of the exciting coil L2.

Moreover, the base of the PNP-type transistor TR15 is connected with the collector of the transistor TR14 via a resistor R38 and a diode D6 in series, the emitter is connected to another end of the operation switch (DN), and the collector is connected with: the base of the transistor TR10 via a diode D12; one end of the exciting coil L2 via a diode D11; the other end of the exciting coil L2 via a diode D15; and the base of transistor TR13 via a diode D19.

With the above-described construction, the power window apparatus operates in the same way as in the first embodiment when the submergence detecting sensor PinA detects no water. Therefore, a description of the operation of the power window apparatus in this case is omitted.

When the submergence detecting sensor detects water, a voltage from the automobile power terminal 18 is applied to the base of the transistor TR14, which is turned on. At this time, since the emitter is grounded, the collector also becomes substantially the ground voltage, and the collector voltage is applied to the bases of the transistors TR10 and TR11 via the diodes D7 and D8. Consequently, both the transistors TR11 and TR10 are turned on and their respective collectors are applied with a voltage from the automobile power terminal 13 or 14. As a result, since the voltage is applied to both the exciting coils L1 and L2, no voltage is supplied to the driving part 11, which will not operate. Therefore, the windows will not operate, either.

At this time, when the operation switch (DN) is operated, a connection destination of one end thereof is switched from the ground to the automobile power terminal 15 side. Consequently, the transistor TR15 is turned on because the base is connected to the collector of the transistor TR14, and the collector is applied with a voltage of the automobile power terminal 15. Since the collector voltage is applied to both ends of the exciting coil L2, and the base of the transistor TR10, the transistor TR10 is turned off, and since an equal voltage is applied to both ends of the exciting coil L2, no voltage is supplied to the exciting coil L2, with the result that a voltage is applied to only the exciting coil L1 and the automobile power is supplied to the driving part 11. The driving part 11 starts operation and the windows are opened.

With the above-described construction and operation, even when an automobile falls into water, the windows are surely stopped without performing unexpected operations, and can be surely opened by operating the operation switch (DN), thus enabling occupants to escape from the automobile.

In the second embodiment, with the transistor TR14 connected to the submergence detecting sensor PinA, when the transistor TR14 is turned on, the transistors TR11 and TR10 are turned on via the transistor TR14. By this construction, the submergence detecting sensor PinA has only to be fed with such a small current as to turn on the only transistor TR14 and can therefore detect submergence quickly and surely.

Also, by the collector voltage of the transistor TR15, a voltage from the automobile power terminal 15 is applied to both ends of the exciting coil L2 and the transistor TR10 is turned off. By this construction, it can be further ensured that no current flows through the exciting coil L2, and therefore the windows can be further surely opened.

Figure 3:
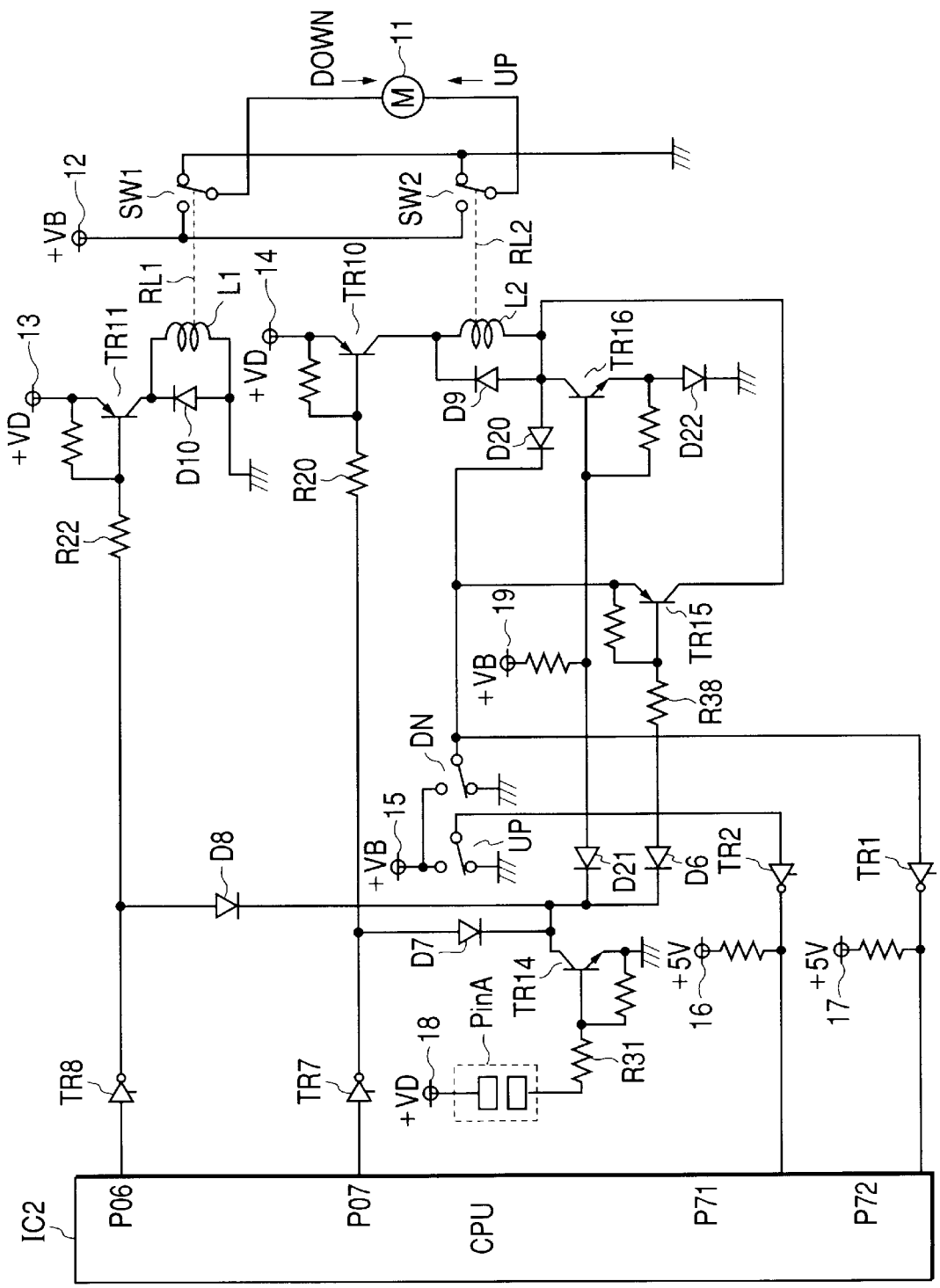
FIG. 3 is a circuit diagram showing a third embodiment of the power window apparatus of the present invention.
Figure 4:
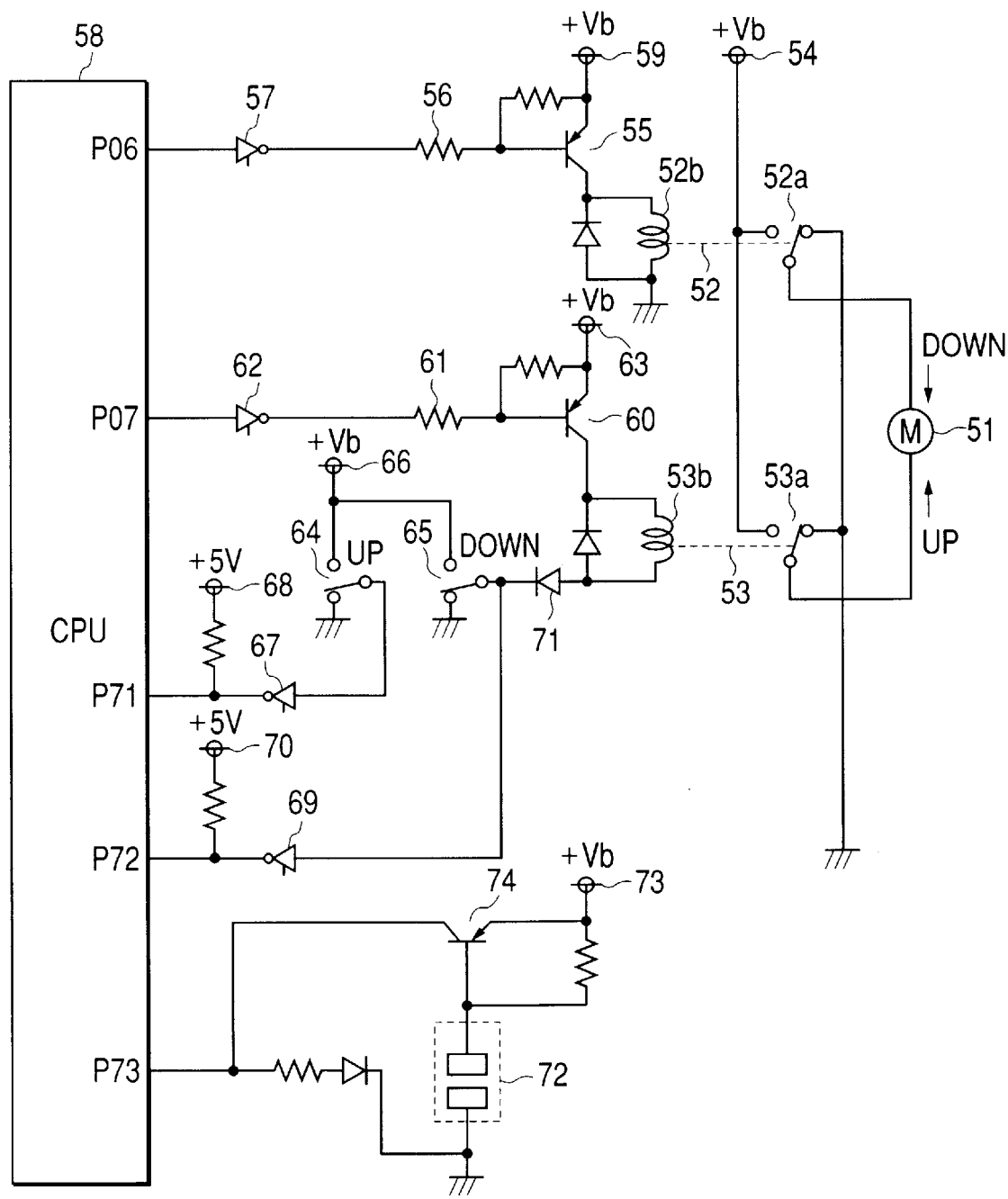
FIG. 4 is a circuit diagram showing the configuration of a conventional power window apparatus.

FIG. 3 is a circuit diagram showing a third embodiment of the power window apparatus of the present invention. Components in FIG. 3 that are identical to components in FIGS. 1 and 2 are identified by the same reference numerals, and a detailed description of them is omitted.

In the third embodiment, an NPN-type transistor TR16 corresponding to the transistor TR13 in the second embodiment is provided. The transistor TR16 has: a base connected to the collector of the transistor TR14 via a pullup power 19 and a diode D21 in series; an emitter grounded; and a collector connected to the other end of the exciting coil L2. The collector of the transistor TR15 is connected to only the other end of the exciting coil L2.

With the above-described construction, the power window apparatus operates the same as in the first embodiment when the submergence detecting sensor PinA detects no water. Therefore, a description of the operation of the power window apparatus in this case is omitted.

Also, when the submergence detecting sensor PinA detects water, the power window apparatus operates the same as in the second embodiment. Therefore, a description of theoperation of the power window apparatus in this case is omitted.

When the operation switch (DN) is operated, a connection destination of one end thereof is switched from the ground to the automobile power terminal 15 side. Consequently, the transistor TR15 is turned on because a voltage of the automobile power terminal 15 is applied to the emitter and the base is connected to the collector of the transistor TR14, and the collector is applied with the voltage of the automobile power terminal 15. Since the collector voltage is applied to the other end of the exciting coil L2, an equal voltage (exactly, one end of the exciting coil L2 is about 0.7 V higher than the other end thereof) is applied to both ends of the exciting coil L2. As a result, no current flows through the exciting coil L2, so that a current flows through only the exciting coil L1 and the automobile power is supplied to the driving part 11. The driving part 11 starts operation and the windows are opened.

With the above-described construction and operation, even when an automobile falls into water, the windows are surely stopped without performing unexpected operations, and can be surely opened by operating the operation switch (DN), thus enabling occupants to escape from the automobile.

In the third embodiment, the power window apparatus is constructed inexpensively with fewer parts including diodes than in the second embodiment.

Also in the third embodiment, the transistor TR14 has the same effect as in the second embodiment.

Although, in the embodiments of the present invention, windows have been described as a target driven by the driving part 11, without being limited to the windows, the present invention is applicable to whatever are opened or closed by the driving part 11, such as sunroof and doors.

As has been described above, according to the present invention, the power window apparatus comprises: a driving part that has two current input-output ends, and drives automobile open/close parts open or close, depending on the direction of a driving current flowing via the current input-output ends; two relays which each have an exciting coil and a switching contact, wherein, when a current is fed to the exciting coil, the switching contact connects the current input-output end to a positive or negative pole of power; a submergence detecting sensor that drops in resistance value between both ends thereof when exposed to water; and a submergence-time escape switch that forcibly drives the open/close parts open upon submergence, wherein two transistors are provided which are connected in series with the exciting coils and feed a current to the exciting coils when turned on, and the base of each transistor is connected to a potential point through which a base current flows via the submergence detecting sensor. By this construction, even if insulation resistance between terminals of discrete parts such as transistors drops because of submergence, currents can be fed to the exciting coils without fail and both switching contacts of the relays are switched, whereby voltages at the current input-output ends of the driving part become equal and the driving part is stopped, with the result that the operation of the open/close parts can be stopped without fail and the open/close parts can be opened by operating the submergence-time escape switch.

What is claimed is:

1. A power window apparatus, comprising:
   a driving part that has two current input-output ends, and drives automobile open/close parts open or close, depending on the direction of a driving current flowing via the current input-output ends;
   two relays which each have an exciting coil and a switching contact, wherein, when a current is fed to the exciting coil, the switching contact-connects the current input-output end to a positive or negative pole of power;
   a submergence detecting sensor that drops in resistance value between both ends thereof when exposed to water; and
   a submergence-time escape switch that forcibly drives the open/close parts open upon submergence, wherein:
   two transistors are provided which are connected in series with the exciting coils and feed a current to the exciting coils when turned on; and
   the base of each of the transistors is connected to a potential point through which a base current flows via the submergence detecting sensor.

2. A power window apparatus, comprising:
   a driving part that has two current input-output ends, and drives automobile open/close parts open or close, depending on the direction of a driving current flowing via the current input-output ends;
   two relays which each have an exciting coil and a switching contact, wherein, when a current is fed to the exciting coil, the switching contact connects the current input-output end to a positive or negative pole of power;
   a submergence detecting sensor that drops in resistance value between both ends thereof when exposed to water; and
   a submergence-time escape switch that forcibly drives the open/close parts open upon submergence, wherein:
   two transistors are provided which are connected in series with the exciting coils and feed a current to the exciting coils when turned on; and
   the base of each of the transistors is connected to a potential point through which a base current flows via a transistor the base of which is connected to a potential point through which a base current flows via the submergence detecting sensor.

3. The power window apparatus according to claim 1, wherein
   a transistor is provided that applies a voltage of automobile power to both ends of one of the exciting coils, wherein the transistor is turned on when the submergence detecting sensor is exposed to water and the submergence-time escape switch is operated.

4. The power window apparatus according to claim 2, wherein
   a transistor is provided that applies a voltage of automobile power to both ends of one of the exciting coils, wherein the transistor is turned on when the submergence detecting sensor is exposed to water and the submergence-time escape switch is operated.

* * * * *